May 3, 1955  H. J. McSKIMIN  2,707,391
TESTING VISCOUS LIQUIDS
Filed Oct. 23, 1951  2 Sheets-Sheet 1

INVENTOR
H. J. McSKIMIN
BY
N. A. Ewing
ATTORNEY

May 3, 1955

H. J. McSKIMIN 2,707,391

TESTING VISCOUS LIQUIDS

Filed Oct. 23, 1951

INVENTOR
H. J. McSKIMIN
BY
N. A. Ewing
ATTORNEY

United States Patent Office 2,707,391
Patented May 3, 1955

2,707,391

TESTING VISCOUS LIQUIDS

Herbert J. McSkimin, Basking Ridge, N. J., assignor to Bell Telephone Laboratories, Incorporated, New York, N. Y., a corporation of New York Application October 23, 1951, Serial No. 252,687

15 Claims. (Cl. 73—59)

This invention relates in general to the measurement of the mechanical properties of viscous liquids, and more particularly to the measurement of such properties as shear impedance, shear stiffness and viscosity.

When a sinusoidally varying shearing stress is set up in a viscous fluid, a corresponding shearing strain is produced in the fluid, which may be proportional to, but out of phase with, the applied stress. Since for small particle displacements stress and strain are linearly related, as stated by Hooke's law, the shear stiffness and the shear viscosity may be defined by the following equation:

$$T = (\mu + j\omega\mu') S = \mu S + \mu' \frac{dS}{dt} \quad (1)$$

where $T$ = the sinusoidally varying shearing stress
$S$ = the shearing strain
$\mu$ = the shear modulus
$\mu'$ = the coefficient of viscosity
$\omega = 2\pi$ frequency
$j = \sqrt{-1}$, and
$t$ = time.

It is sometimes convenient to transpose Equation (1), defining the strain components instead of stress components, in accordance with the following relationship:

$$\frac{1}{(\mu + j\omega\mu')} T = S \quad (2)$$

or $$\left(\frac{1}{G} + \frac{1}{j\omega\eta}\right) T = S \quad (3)$$

where $G$ represents the shear stiffness, and
$\eta$ represents the viscosity.

In an ideal viscous liquid, the shear stiffness $\mu$ is zero, and the stress is entirely proportional to the viscosity and strain rate in agreement with the usual definition of viscosity. Although all known liquids possess some degree of stiffness, this parameter is of practical significance only in the more viscous liquids.

In prior art practice, several torsional standing-wave vibrational techniques have been used to measure viscosity and related properties of liquids.

One such standing-wave method and apparatus for measuring viscosity has been disclosed in Patent No. 2,340,992 which issued February 8, 1944 to S. Siegel. The system disclosed by Siegel comprises a generator of torsional vibrations and connected torsionally driven rod for insertion in the test liquid. From readings taken at or near resonance, the equivalent resistance of the piezoelectric driving unit is utilized as a measure of the viscosity of the test liquid.

The resonance technique described above has certain significant limitations which make it unsuitable for many applications. In the first place, it is limited to a narrow range of frequencies; and inasmuch as its operation depends on setting up standing waves in a vibrating system of critical dimensions, the operating frequency range cannot be changed without modifying the system. Moreover, in a standing wave system of the type indicated, no simple means is provided for testing for the purity of the induced torsional waves or eliminating the possibility of spurious readings in the indicating device due to vibrations in other than the torsional mode. A further disadvantage of a resonant system such as disclosed by Siegel supra, is the necessity for calibrating the instrument with reference to a standard liquid. Moreover, in measuring extremely viscous liquids, the instrument is so heavily loaded that the resonant peaks are not sufficiently distinctive to make the measurements accurate.

The principal object of the present invention is to provide improvement in measuring certain properties of highly viscous liquids.

Another object of the present invention is to provide an instrument for measuring the characteristics of viscous liquids which may be operated over a wide range of torsional wave frequencies.

A more specific object of the present invention is to provide an instrument for measuring the characteristics of viscous liquids in which the purity of the induced torsional waves is subject to frequent check.

Another specific object of the present invention is to provide a torsional wave viscometer in which the dimensions of the components are not critically related to the operating frequency.

Still another object of the present invention is to provide a viscometer which may be calibrated to read viscosities without reference to a standard liquid.

In accordance with the present invention, the aforesaid objects are attained in a viscometer which comprises a generator of a series of torsional wave-trains connected in driving relation to an attached vibratile rod adapted for immersion in the test liquid. The wave-trains which are excited in one end of the rod, travel its length, and are either reflected back to the generator or directly transmitted to a receiver where they are selectively received and measured as to relative amplitude and phase.

In one embodiment, the pulse-modulated torsional wave system of the present invention includes a rod which may comprise glass or a glass-like material, a metal, metallic alloy, or even a ceramic or plastic material. In preferred form, the rod should have a temperature-stability characteristic such that the total phase shift sustained by wave-trains traveling down the rod varies little with changes in temperature. The vibratile rod is coupled to a driving unit comprising, for example, a cylindrical quartz crystal cut for torsional vibration. The vibratile unit comprising the crystal and rod is placed inside of a double-bored glass jacket, the inner bore of which may contain the liquid to be tested, and the outer bore of which serves as a temperature control unit in which water or other cooling fluid is circulated to maintain the vibratile unit and the test liquid at the desired temperature.

In certain of the embodiments, in order to permit the use of a single crystal for both transmitting and receiving, a bridge circuit is provided with a pair of impedance arms including the vibratile unit on one side, and a balancing impedance on the other side. This auxiliary impedance serves to balance out the relatively high voltage applied to the crystal terminals, so that only the wave-trains reflected from the vibratile unit, and not the input wave-trains, appear across the output, thereby preventing overloading of the amplifiers connected between the output of the bridge-circuit and the indicating device, which in preferred form is a cathode-ray oscilloscope. The high frequency input voltage is pulse-modulated at the desired repetition rate by a gating circuit, which is also used to synchronize the sweep circuit of the cathode-ray tube indicator. Upon the face of the indicator are displayed the received wave-train indications, the amplitude and phase of which are to be measured, balanced against an indication of the applied unmodulated input voltage derived from a separate circuit connection to the alternating-current source. A calibrated phase shifter and a calibrated attenuator are included in conjunction with the circuit to permit adjustment of the attenuation and phase of the pulse-modulated waves inpressed on the rod against the unmodulated waves from the alternating-current input source.

With only air surrounding the rod, a phase reference and amplitude reference are obtained for the first received wave, or subsequent echoes, if greater sensitivity is desired. A definite length of the rod is then immersed in the liquid to be measured with a resulting amplitude reduction and change in phase. These two quantities can be measured and used to calculate the shear impedance presented to the rod surface by the liquid, from which quantity it is possible to calculate the viscosity and shear stiffness in a manner to be explained in detail hereinafter.

Certain modifications of the system of the present invention have been provided with a view to adapting the system especially for the measurement of viscosity and related properties of liquids in certain large scale operations.

In accordance with one such modification, the vibratile unit is designed for insertion into the sidewalls of a pipe through which the test liquid is flowing. For minimizing changes in the calibration of the instrument caused by aging and small shifts in temperature the test system may include a second vibratile unit located adjacent the first, but encased in a sealed jacket containing a fluid of negligible viscosity.

A further variation of the system of the present invention involves the use of a vibratile unit comprising a single vibratile rod having piezoelectric units connected to each of its two ends for separately transmitting and receiving the torsional vibrations, thus eliminating the necessity for a bridge-circuit to balance out the input signals.

In comparing the pulse-modulated torsional wave viscosity measuring system of the present invention with the standing wave systems of the prior art, certain advantages are apparent. An important feature of the present invention is that the viscosity or shear stiffness of a liquid may be computed directly from readings on the instrument without calibration by a standard reference liquid. Moreover, the time separation between the transmitted and received wave-trains in the disclosed system as indicated on the cathode-ray oscilloscope, provides a simple means for testing the purity of the waves and the presence of spurious indications due to other modes of oscillation which, if present, may often be disregarded because they do not interfere with the principal torsional mode. Moreover, in the disclosed wave-train system, it is possible to use as large an effective path length as desired for the accuracy of the measurements, by disregarding all those patterns except the one corresponding to the selected received echo. This enables the measurement of liquids over a wide range of viscosities. Another advantage to be derived from the use of the wave-train system of the type described herein is that neither the operating length of the immersion rod nor the position of its junction with the driving unit are critical, these dimensions being determined as convenient for the operation to be performed.

Other objects, features, and advantages of the present invention will be apparent from a study of the specification, the appended claims, and the drawings in which:

Figure 2:
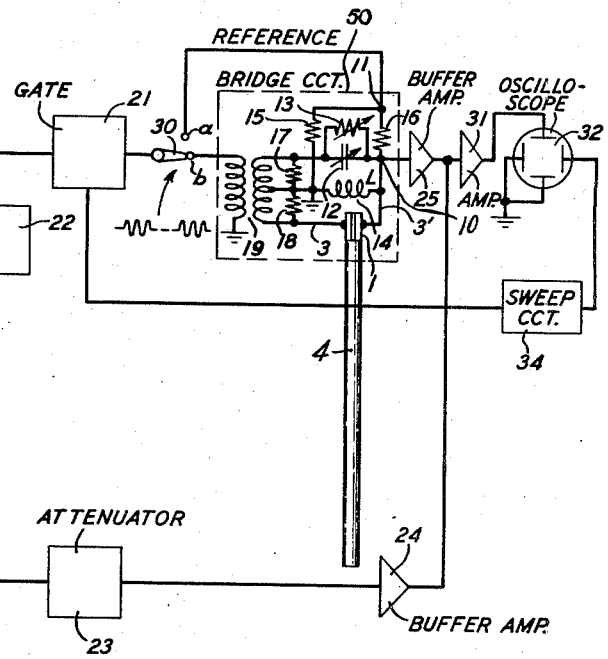
Fig. 2 shows a schematic diagram of the bridge circuit of the present invention, including the vibratile unit shown in detail in Fig. 1.
Figure 3C:
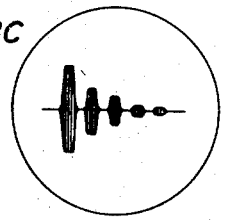
Figure 3A:
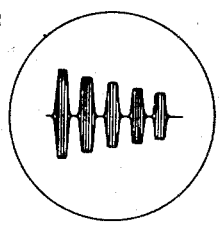
Figure 3B:
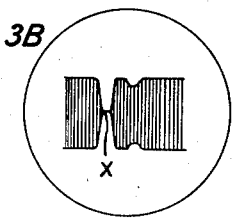
Figure 4:
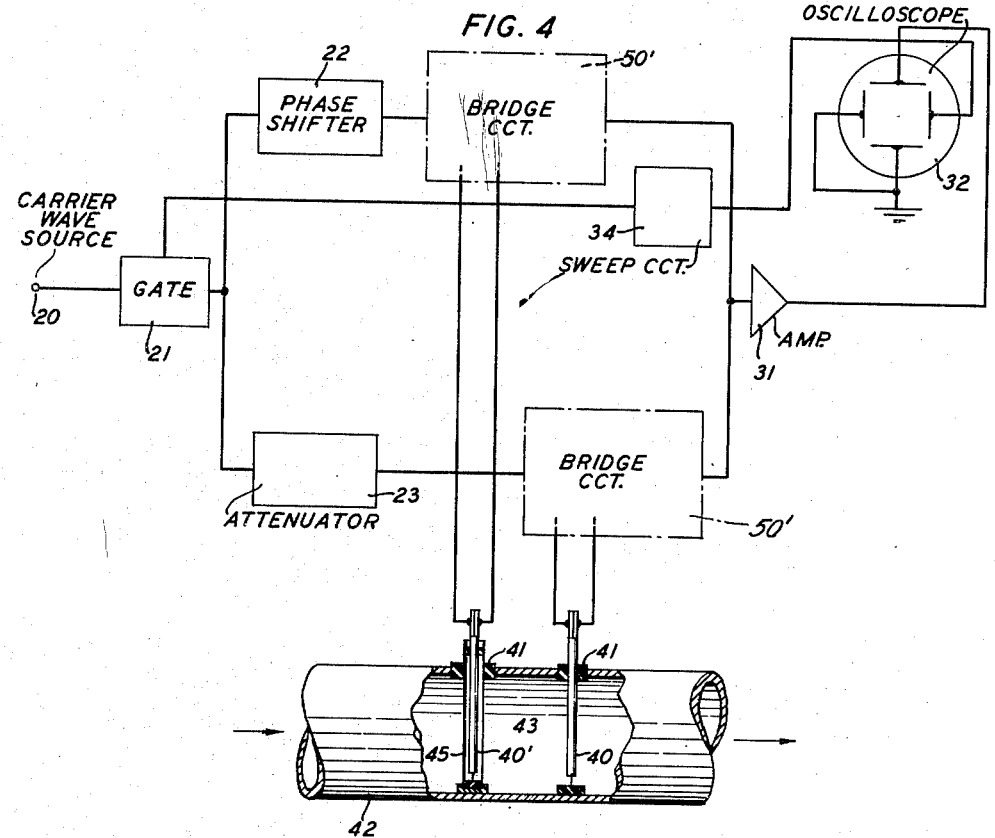
Figure 5:
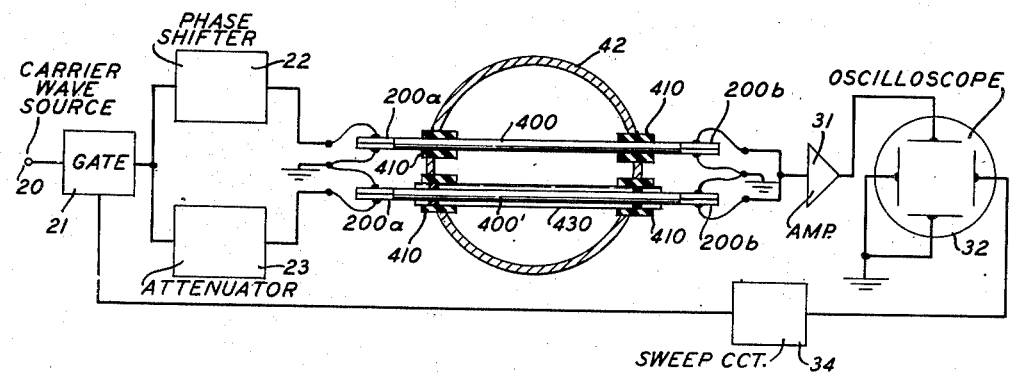

Figs. 3A, 3B, and 3C show typical indications such as may appear on the face of the cathode ray oscilloscope of Fig. 2;

Fig. 4 shows an alternative embodiment of the present invention, adaptable for the measurement of viscosity and related properties in certain large-scale operations, in which the circuit includes an additional vibratile unit to compensate for temperature and aging effects; and Fig. 5 shows a variation of the embodiment disclosed in Fig. 4 in which each vibratile rod is connected to a pair of separate piezoelectric units for transmitting and receiving, and the bridge-circuits are eliminated.

A practical instrument for measuring certain characteristics of viscous liquids in accordance with the teachings of the present invention will now be described in detail.

Figure 1:
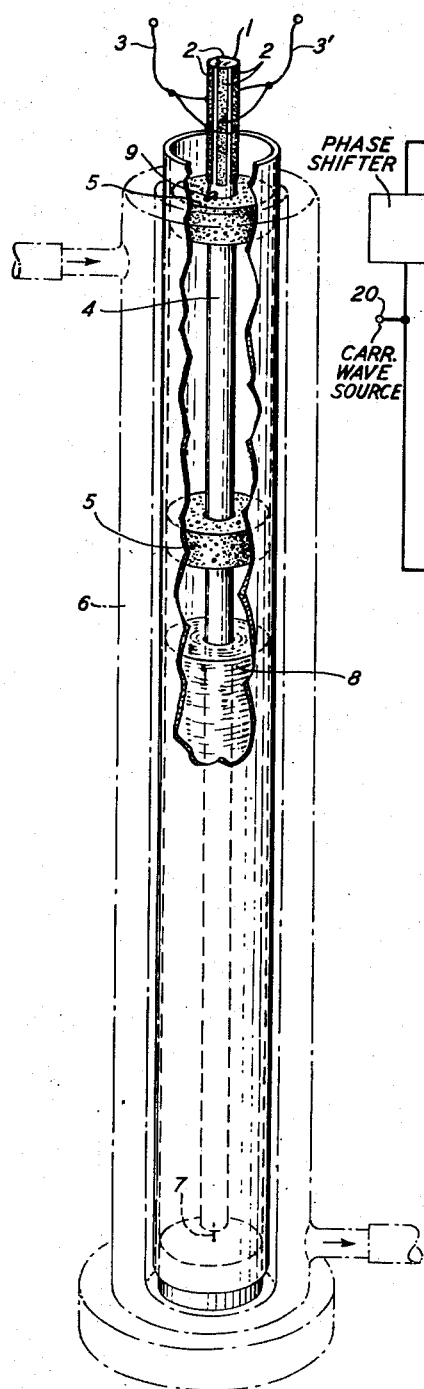
Fig. 1 shows a detailed view of the vibratile unit of the present invention including the piezoelectric driver and the connected rod for immersion in the liquid to be tested.

Fig. 1 shows in detail a vibratile unit in accordance with the present invention, including a torsionally driven rod for insertion in the test liquid. The piezoelectric driving unit 1 comprises a cylinder of quartz, for example, 0.8 inch long and 0.2 inch in diameter, cut with the long axis of the cylinder parallel to the X axis of the quartz. The axis of this cut is preferably held within an angular tolerance of 10 minutes so that it vibrates with a motion which is as purely torsional as possible. A further discussion of the design of crystals to vibrate in a torsional mode will be found in section 6.33, chapter VI of "Piezoelectric Crystals and Their Application to Ultrasonics" by W. P. Mason, D. Van Nostrand Company, Inc., 1949.

Four gold electrodes 2 evaporated longitudinally upon the circular periphery of the cylindrical crystal 1 serve to bring the applied voltage to the surface of the crystal. These are spaced in the four quadrants around the cylinder and run the length of the crystal. The spaces between the electrodes are located at the Y and Z axes of the quartz. When opposite electrodes are electrically connected, the application of a voltage causes the crystal to twist very slightly about the central longitudinal axis.

The wires 3 and 3', which serve as leads for the electrical connections, may comprise fine Number 40 copper wires which are soldered in a conventional way to the sides of the crystal at the centers of the electrodes in the plane bisecting the crystal, or in any other manner taught in the art.

The paint used to make the spots to which the electrodes are soldered may comprise silver paste of any of the types well-known in the art. A paint which may be used, for example, is the No. 50 silver paste manufactured by Hanovia Chemical and Manufacturing Company, thinned with 15 per cent by weight of turpentine before using.

The crystal surfaces are cleaned chemically and with distilled water, after which the spots of silver paint are applied with a small stylus. The silver is baked onto the crystal at a temperature of 540 degrees centigrade, maintained for 20 minutes. When the furnace has cooled, the crystals are removed and the leads soldered to the paint spots, an operation which may be performed by holding the solder and the lead in contact with the paint spot and directing a stream of heated nitrogen at the solder. After a few seconds, the solder melts and forms a bond between the lead and the crystal. In applying the gold electrodes 2, strips of cellulose tape are applied to the crystals as a mask. The gold is evaporated onto the crystal from tungsten filaments held near it in the vacuum unit. After the process is completed, the resistance between each electrode and the corresponding lead is checked to see that it is no greater than 10 ohms.

In preferred form, the rod 4 has a temperature-stability characteristic, such that for vibrations passing down the rod the total phase shift at a given frequency should be practically independent of temperature with a coefficient say, of less than twenty parts per million per degree centigrade. Since phase-shift is a function of the frequency times the length of the rod divided by the velocity of propagation of torsional waves in the specified medium, it has been necessary to investigate a number of materials to find one in which this ratio is substantially independent of temperature. Another characteristic to be desired in the material selected for the rod 4 is that no appreciable change in the plot of phase-shift versus temperature for the waves passing down the rod should occur as the result of aging, as this would invalidate previous calibrations made with the instrument.

A nickel-iron alloy having the desired temperature-stability characteristics for the purposes of the present invention is disclosed by M. E. Fine in Patent No. 2,561,732 issued July 24, 1951. As mentioned above, rods comprising other materials such as metals, glass or glass-like materials such as quartz, and even ceramics and plastics have been found suitable for the purposes of the present invention. Although the temperature-stability characteristics of glass are not in general as good as the alloy mentioned above, and certain other metallic materials, glass has the advantage of having a lower mechanical impedance, making it suitable for taking measurements in the less viscous liquids.

The immersion rod 4 is soldered to one of the flat surfaces of the quartz driving unit 1. The surface of the quartz, and of the rod, if glass is used, is prepared for soldering in the manner described with reference to the lead contact points, by application of a metallic paste. It has been found that the strains at the soldered juncture are minimized by the use of a lead-tin-bismuth eutectic solder, which melts at a low temperature.

In the illustrative embodiment described, the torsional crystal 1 has a resonance frequency of 100 kilocycles, and the rod 4 has a length of 21 inches and a cross-sectional diameter of 0.2 inch. These values are not critical, and may be varied as convenient for the measurements to be performed.

In preferred form, the vibratile rod 4 is provided with two protruding stub pins 9 near its upper extremity, which are short enough that their free resonances are well above the frequency of operation. The pins 9 serve as a grip for use by the operator in mounting the rod 4 within the inner bore of jacket 6, where the rod is held in position by several loose-fitting sponge rubber rings 5. The lower extremity of the rod 4 is, in preferred form, pivoted upon a centrally located needle point 7 which projects up from a rubber stopper or seal at the base of the inner bore of jacket 6. The pivot point 7 may be so positioned that when it engages the rod 4 it lifts the stub pins 9 above the upper sponge rubber ring. However, in case the pins 9 rest on the upper ring, they produce only slight damping of the vibrations in the rod 4.

Water or other cooling fluid is circulated through the outer bore of the glass jacket 6 in order to keep the vibratile unit at a selected temperature within the range 0–80 degrees centigrade. The test liquid 8 may be placed either directly into the inner bore of the glass jacket 6 or, in another tube which is inserted into the bore of jacket 6 from the bottom to surround the rod up to a fixed mark, the added tube containing the needle point support, if desired.

A preferred form of measuring circuit of the present invention, which includes the vibratile unit of Fig. 1, is shown in detail in Fig. 2 of the drawings. In order to permit the use of a single crystal transducer for both receiving and transmitting, the crystal 1, as shown in Fig. 1, is mounted in an impedance bridge circuit 50 which comprises as its four branches a pair of resistance arms, 17 and 18 of the order of 1000 ohms each, the vibratile unit 1–4, and the balancing condenser 12 in parallel with resistance 13.

Resistors 17 and 18 are respectively connected between ground and each of the high potential terminals of the center-tapped secondary of input transformer 19. Input signals are fed across the primary coil of transformer 19 to ground from the conventional source 20 of alternating electromotive force through a series circuit which includes the conventional phase shifter 22, and gating circuit 21, the latter of which operates to modulate the radio-frequency input from the source 20 in the form of wave-trains having a repetition rate within the range 20–1000 per second. The preferred length for the modulating pulse should be less than half of the total delay sustained by the waves passing down the rod and back, e. g. 150 microseconds.

Gating or pulsing circuit 21 may assume the form of any of the on-off switching circuits well known in the art, such as, for example an amplifier arranged to have its output periodically unblocked by a direct-current pulse from a source such as a multivibrator. The pulsed output from the multivibrator may also be separately connected to synchronize the sweep generator 34 connected to the horizontal deflecting plates of cathode-ray oscilloscope 32.

A tuning inductance 14 is connected between ground and the junction 10 of the vibratile unit 1–4, condenser 12, and resistor 13. Inductance 14 is variable over a range of millihenries and serves to tune the total output capacitance of the bridge at the operating frequency. The junction 10 is also connected through the 20 megohm resistance 16 to another junction 11, from which one branch is extended through the 250 ohm resistor 15 to ground, and another branch to contact $a$ of switch 30. The switch 30, under conditions of normal operation, connects the output terminal of gating circuit 21 through its $b$ contact to the primary coil of transformer 19. However, for the purposes of adjustment the output terminal of gating circuit 21 can also be connected directly through contact $a$ of switch 30 to the junction 11. This is for the purpose of making an initial adjustment before each reading of the relative amplitude and phase of waves in both the modulated and non-modulated branches of the circuit, exclusive of the waves reflected from the rod 4, to check the phase and level changes occurring in the amplifiers and other circuit elements.

The junction 10 in the output of the bridge circuit is connected through buffer amplifier 25 to the vertical deflecting plates of oscilloscope 32. A second connecting circuit between the carrier wave source 20 and the vertical deflecting plates of oscilloscope 32 includes the attenuator 23 in series with the buffer amplifier 24. Buffer amplifiers 24 and 25 function as impedance matching circuits which also isolate the unmodulated carrier wave circuit from the pulse-modulated carrier wave circuit passing through the bridge, thereby eliminating the possibility of standing waves being set up in the vibratile unit. This is advantageous inasmuch as the output of the bridge circuit may require relatively high impedance, of the order of 10,000 ohms, and the output of the attenuator 23 requires a much lower terminating impedance of the order of 100 ohms. Additional amplification up to 80 decibels is obtained through the amplifier 31 connected to the vertical deflecting plates of the oscilloscope 32.

The embodiment just described operates as follows for the determination of the shear impedance of a tested liquid, from the real and imaginary components of which the shear stiffness and viscosity may be determined mathematically in a manner to be described hereinafter.

Before any measurements are made, the capacitor 12 and resistor 13 are adjusted to balance out the impedance presented at the operating frequency across the terminals of the vibratory unit 1–4. The purpose of this adjustment is to prevent overloading of the amplifiers 25 and 31 and the indicator 32 by balancing out the transmitted pulse. In practice, the transmitted pulse is usually not completely cancelled, but is made small enough so that it does not interfere with the measurements.

The first step in making the measurements, which is performed with the unloaded rod, is the adjustment of both the phase and attenuator settings to balance the first received wave-train passing through the bridge circuit against the continuous wave component passing through the attenuator 23. With the branch including the attenuator 23 disconnected from the oscilloscope, the indication which appears on the face of the oscilloscope 32 takes the form shown in Fig. 3A of the drawings. If, then, the series circuit including attenuator 23 is connected to the vertical deflecting plates of the oscilloscope as shown, the unmodulated carrier-wave signal through that branch is superposed on the pulse-modulated carrier-wave signal received through the bridge-circuit. If the attenuator 23 and the phase shifter 22 are so adjusted that complete cancellation takes place between the unmodulated carrier-wave signal and that of the first received pulse or wave-train from the bridge circuit, a balance indication, such as shown in Fig. 3B of the drawings, appears on the face of the oscilloscope 32. (The line $x$ is reduced to substantially zero width.) A plot of the balance phase and level are then made as a function of temperature. The test liquid is then introduced into the apparatus, either by pouring it from the top into the inner bore of the jacket 6, or by inserting it from the bottom into the inner bore until the rod 4 is immersed up to a given level. With the carrier wave source and attenuator branch disconnected, a showing such as indicated in Fig. 3C is obtained on the oscilloscope. With the aforesaid branch connected, the attenuator and phase-shifter are again adjusted to produce a cancellation of the first pulse producing an indication on the oscilloscope 32, similar to that shown in Fig. 3B described above. (Any of the reflected pulses may be used, providing the reference pulse represents the same order reflection in each case.) From the balance readings taken on the attenuator, and on the phase-shifter, a new plot is made as a function of temperature. The differences between the readings on the attenuator and on the phase-shifter before and after the addition of the test liquid are designated $\Delta A$ and $\Delta B$ respectively. From these values it is possible to calculate Z, the loading impedance per square centimeter of the cylindrical rod surface from the following formula:

$$Z = \frac{\rho v_0 a}{4l}(\Delta A + \Delta B) \quad (4)$$

where $\rho$ = density of the rod material
$v_0$ = torsional wave velocity in the free rod
$a$ = radius of the rod
$l$ = length of the rod covered by test liquid
$\Delta A$ = change in attenuation in nepers to reestablish balance
$\Delta B$ = phase shift in radians to reestablish balance.

The shear impedance per square centimeter may be defined as the ratio of the shearing stress to the ensuing particle velocity.

For ease in calculating the shear viscosity and stiffness of the test liquid from a determination of Z, one may correlate this Z representing the shear impedance on the cylindrical surface, as calculated above, to the characteristic impedance $Z_k$ for plane shear waves in the liquid. This correlation is given by the following relationships:

$$Z = j\left[\frac{H_0^{(2)}(ka)'}{H_1^{(2)}(ka)'} - \frac{2}{(ka)'}\right]Z_k \quad (5)$$

$$(ka)' = \frac{\rho'\omega a}{Z_k} \quad (6)$$

$a$ = radius of rod
$\omega = 2\pi f$
$\rho'$ = density of test liquid

The solution of Equations 5 and 6 may be obtained graphically giving the solution of $Z_k$ in terms of Z. The quantities $H_0^{(2)}(ka)'$ and $H_1^{(2)}(ka)'$, which are Bessel functions, may be evaluated from the literature.

Except for very heavy loading of the rod, however, the results of Equation 4 may be used directly with little error. For example, calculations indicate that in the case of a very viscous liquid for which the absolute value of $(ka)' = 10$ and the phase angle of $(ka)' = -30$ degrees, the absolute value of the multiplier of $Z_k$ of Equation 5 is approximately 1.08, at an angle of $-7$ degrees. For absolute values of $(ka)'$ less than 10, the correction multiplier rapidly becomes important. For low viscosities, for which the absolute values of $(ka)'$ are greater than 100, $Z_k$ may be taken as equal to Z with little error.

After the correlation of $Z_k$ in terms of Z has been obtained, the shear stiffness G and viscosity $\eta$ may be determined from the real and imaginary components of $Z_k$ as follows:

$$Z_k = R + jX \quad (7)$$

$\eta$ and G, which are defined in the stress-strain relationship set forth in Equation 3, may now be determined from the following relationship:

$$\eta = \frac{(R^2 + X^2)^2}{2RX\rho'\omega} \quad (8)$$

$$G = \frac{(R^2 + X^2)^2}{\rho'(R^2 - X^2)} \quad (9)$$

This procedure enables the determination of both viscosity and shear stiffness simultaneously from a single set of readings.

It may be convenient in certain commercial embodiments to set up a system in accordance with the present invention in which certain control dials are calibrated in such units as to maintain the viscosity of a continuously tested liquid within certain desired limits.

Such a system is shown in Fig. 4 of the drawings, in which a vibratile unit 40 similar to the unit 4 shown in Fig. 1 of the drawings and associated with a driving mechanism similar to the crystal 1 described hereinbefore is inserted through an arrangement of liquid-tight, torsionally yielding gaskets 41, comprising a material such as soft rubber, into the side walls of a pipe 42 through which flows a liquid 43, the viscosity and/or the shear stiffness of which is to be continuously measured.

In order to provide a set of controls which operate continuously during the test, a second vibratile unit 40', which is encased in a sealed chamber 45 containing air, water, or some other low viscosity fluid, is also inserted in the pipe 42 at a point adjacent the unit 40. This dual arrangement provides greater stability with respect to small changes in temperature, and also for frequency fluctuations and changes due to aging of the rod material.

The vibratile units 40, 40' may be pivoted at their lower extremities on a set of pivot points similar to the pivot 7 described with reference to Fig. 1, which extend upwardly from the inner wall of the pipe 42 at points opposite the openings in the pipe wall to engage the units 40 and 40'.

Each of these units is included as an arm of an impedance bridge circuit 50', similar to the bridge-circuit 50 shown and described with reference to Fig. 2 hereinbefore. The bridge-circuits 50' differ from the bridge-circuit 50 of Fig. 2 in that they do not include the reference branch comprising resistors 15 and 16 and switch 30, although it is apparent that such adjusting circuits could be added.

The respective input transformers of the bridge-circuits 50' are each connected to the carrier wave source 20 through separate circuits extending from the output of gating circuit 21 which operates as previously described to modulate the carrier wave output in a series of wave-trains (or pulses) which are impressed on the vibratile units 40 and 40'. A phase-shifter 22 and an attenuator 23 are included in one or othe other of the circuits from the output of the gate circuit 21 to permit adjustment of the phase and attenuation of one circuit with respect to the other in the manner previously described. As also described, the gating circuit 21 is connected to synchronize the operation of sweep generator 34 which is connected to the horizontal deflecting plates of oscilloscope 32.

The output terminals of bridge-circuits 50' are connected through amplifier 31 to the vertical deflecting plates of the oscilloscope 32, in the manner described with reference to the circuit shown in Fig. 2.

In operation, the phase-shifter and attenuator are adjusted to obtain a balance indication on the oscilloscope with the vibratile units removed from the pipe 42, and again after they are both inserted in the pipe with the liquid at a fixed level. Alternatively, the liquid can be removed from and restored to the pipe with the units remaining in position. The difference between the initial and final readings on the attenuator and on the phase-shifter give $\Delta A$ and $\Delta B$, as before, from which values the viscosity and shear stiffness can be computed in the manner previously described. It is possible with the arrangement shown in Fig. 4 to calibrate the attenuator and phase-shifter so that the viscosity (or shear stiffness) of the tested liquid can be maintained continuously within a certain range of values for which the readings $\Delta A$ and $\Delta B$ are maintained relatively constant under control of an operator.

Another alternative embodiment of the invention also designed for large-scale operations involving the testing of viscous liquids such as, for example, might be required in oil refineries, is indicated in Fig. 5 of the drawings. This differs from the instrument shown and described with reference to Fig. 4 above, principally in the form of the vibratile unit, which in the present embodiment comprises a vibratile rod having both of its extremities connected to torsional piezoelectric units, one of which serves as a driver and the other of which serves as a receiver. With such an arrangement, the presence of the bridge circuits 50' is unnecessary, since the only vibrations appearing in the output are those who have travelled the length of the rod. As in the case of the previously described unit, the present embodiment may also set up with an additional vibratile unit to compensate for changes due to fluctuations in temperature, aging, et cetera.

Referring in detail to Fig. 5, the rod 400, which is similar in form and composition to the rod 4 described in detail in Fig. 2 of the drawings, has connected to one of its ends a torsional wave driving unit 200a and to the other of its ends, a torsional wave receiving unit 200b, both of which are similar in form to the piezoelectric units previously described.

The rod 400 passes transversely across the interior of the pipe 42 through a pair of openings in the sidewalls which are sealed by liquid-tight gaskets 410. As mentioned, a control vibratile unit is provided comprising a rod 400' substantially identical to rod 400, and provided with a similar pair of piezoelectric driving and receiving crystals 200a and 200b.

The rod 400', which is passed across the interior of the pipe 42 adjacent to and in a manner similar to the rod 400, is encased in a jacket 430, which may contain a low viscosity fluid such as air or water.

The driving units 200a are each connected through a gating circuit 21 to the carrier wave source 20. As previously described, the gating circuit 21 serves to modulate the continuous alternating current waves from the source 20 in a series of pulses or wave-trains, which are impressed on the respective rods 400, 400'.

The output pulses or wave-trains from the rods 400, 400', as received by the crystal units 200b, are impressed through the circuit of the amplifier 31 on the vertical deflecting plates of the cathode-ray oscilloscope 32, the sweep circuit 34 of which is synchronized in a manner previously described by connection to the gating circuit 21. In the manner of the previously described circuits, the attenuator 23 and phase-shifter 22 are included in the input circuits to one or the other of the driving units 200a to permit regulation of the attenuation and phase of one of the circuits with respect to the other. A balance is obtained on the oscilloscope 32 in the manner described with reference to the circuit of Fig. 4, and values for $\Delta A$ and $\Delta B$ determined, from which information the values of the viscosity and shear stiffness are computed as previously described.

In the computations for this case, since the first wave-trains to be received by the detecting units 200b pass directly through the rod from the transmitter, the denominator of the right-hand side of Equation 4 is now $2l$ instead of $4l$.

Although this invention has been described herein with respect to certain illustrative embodiments, it will be apparent to those skilled in the art that it is not limited to the specific forms disclosed, and that other combinations and variations are possible within the scope of the teachings of the present invention.

What is claimed is:

1. A device for measuring certain properties including the mechanical shear impedance of viscous liquids which comprises in combination a vibratile unit comprising a rod adapted for immersion in a test liquid, and transducing means connected to said rod for driving said rod to vibrate torsionally, a source of carrier-waves connected to said transducing means, modulating means in circuit relation with said carrier-wave source and said transducing means for modulating the vibrations of said source in a series of wave-trains which are transmitted the length of said rod and reflected, a bridge-circuit including said vibratile unit and means for balancing out the input impedance of said vibratile unit, and indicating means for receiving the wave-trains reflected by said vibratile unit and measuring the effects of the said liquid on the characteristics of said wave-trains.

2. A system for measuring certain properties of viscous liquids which comprises in combination a generator of torsional vibrations, a rod connected in driven relation to said generator for excitation in a torsional mode of vibrations, said rod adapted for immersion to a predetermined length in the liquid to be tested, a source of carrier waves connected to said generator, modulating means connected to said generator and said source for modulating said carrier waves in a series of discontinuous wave-trains which travel the length of said rod, a receiving circuit connected to receive the wave-trains from said rod, indicating means connected to said receiving circuit, a circuit connected to said carrier-wave source for impressing unmodulated carrier waves on said indicating means, and calibrated circuit means connected to said indicating circuit for adjusting the amplitude and phase between said modulated wave-trains and said unmodulated waves.

3. An instrument for testing viscous liquids which comprises in combination a rod adapted for immersion to a predetermined length in a test liquid, an electromechanical wave transducer connected to said rod for driving said rod to vibrate torsionally, a source of carrier waves in circuit relation with said wave transducer, means including a gating circuit connected to said carrier-wave source and said wave transducer for pulse modulating the waves from said source in a series of discontinuous wave-trains which travel down said rod and are reflected back to said transducer, a receiving circuit connected to said transducer to receive the wavetrains reflected from said rod, indicating means connected to receive the pulse-modulated output of said receiving circuit, a circuit for supplying unmodulated carrier waves from said source to said indicating means, and means for adjusting the relationship between the phase and attenuation of said unmodulated waves with respect to said modulated waves.

4. An instrument for testing viscous liquids in accordance with claim 3 which includes an impedance circuit connected in balanced relation with said transducer and said rod for balancing out the input impedance of said transducer and said rod.

5. An instrument for measuring certain properties of viscous liquids which comprises in combination a vibratile unit including piezoelectric driving means, a rod adapted for immersion to a predetermined length in a test liquid, said rod connected in driven relation to said driving means for excitation in a torsional mode of vibration, a source of alternating current energy connected to said piezoelectric driving means, means comprising a gating circuit connected in circuit relation with said vibratile unit and said source for modulating the waves of said source in the form of repeated wave-trains which are transmitted the length of said rod and reflected back to said driving means, an impedance circuit connected in balanced relation with said vibratile unit for balancing out the input impedance of said unit, receiving means connected to said vibratile unit for receiving the wave-trains reflected from said rod, an indicating circuit connected to receive the output energy from said receiving means, and means for measuring changes in attenuation and phase of said wave-trains produced by the presence of said rod in said liquid.

6. An instrument in accordance with claim 5 in which the lower extremity of said rod is supported on a pin extending upwardly from a supporting base.

7. A system in accordance with claim 5 in which the vibratile unit comprising said piezoelectric driving means and said rod is mounted in a liquid-tight chamber.

8. A system in accordance with claim 7 which includes means for mounting said element in said chamber comprising a support comprising a pair of pins mounted near the upper extremity of said rod and having a resonant frequency substantially above the resonant frequency of said vibratile unit.

9. A system in accordance with claim 8 in which said rod is held in position in said chamber by a ring-shaped support comprising soft rubber, and in the vibratile position of said rod, said pins rest on said support.

10. An instrument for measuring the shear impedance of viscous liquids which comprises in combination a vibratile unit comprising a piezoelectric generator of torsional vibrations and a cylindrical rod having transmission properties which are relatively constant with temperature rigidly connected at one of the extremities of said rod to said piezoelectric generator for excitation in a torsional mode of vibrations, a source of carrier waves connected in circuit relation with said piezoelectric generator, a gating circuit for modulating the output of said carrier wave source applied to said piezoelectric generator in a series of wave-trains which are transmitted the length of said rod and reflected back to the said generator, an impedance bridge circuit including as two of its balancing arms said vibratile unit and an impedance arm including a condenser and a resistor for balancing out the input impedance of said vibratile unit, receiving means connected to receive the modulated carrier waves from said bridge circuit, indicating means comprising a cathode-ray oscilloscope including a source of a beam of electrons, the motion of said beam in a first direction controlled jointly by the modulated carrier-wave output derived from said receiving means and by unmodulated carrier-wave output derived from said carrier wave source, a sweep circuit, the motion of said beam in a second direction controlled by said sweep circuit under synchronization by said gating circuit, and means for adjusting the attenuation and the phase of the unmodulated waves from said carrier-wave source with respect to the modulated waves from said bridge circuit.

11. An instrument in accordance with claim 10 in which said bridge circuit and said circuit means for supplying unmodulated waves from said carrier wave source each terminate in separate impedance-matching amplifying circuits the output energies from which are connected to control the beam motion of said cathode-ray oscilloscope in said first direction.

12. An instrument for testing viscous liquids which comprises in combination a pipe for conveying the liquid under test in a directed stream, a vibratile unit comprising a torsional wave-driving means, a rod connected to said driving means for excitation in a torsional mode of vibration, said rod adapted for insertion through an opening in the side wall of said pipe to a predetermined depth in said liquid, a source of carrier waves electrically connected to said driving means, gating means connected to said driving means for modulating the waves of said source to produce a series of wave-trains in said driving means which are propagated vibrationally along the length of said rod, means for receiving the wave-trains propagated along said rod, and indicating means for indicating changes in certain parameters of the wave-trains propagated along said rod brought about by the presence of said liquid.

13. An instrument in accordance with claim 12 which comprises in combination a second vibratile unit comprising a torsional wave-driving means and connected rod, said second vibratile unit connected to said source of carrier waves and said gating means, means for enclosing said second rod within a liquid-tight jacket including a fluid of negligible viscosity, said jacket adapted for insertion through an opening in the side wall of said pipe into said test liquid at a point adjacent said first vibratile unit, and calibrated circuit means for receiving and comparing the output wave-trains from said respective vibratile units on said indicating means.

14. An instrument for testing viscous liquids which comprises in combination a pipe for conveying the liquid under test in a directed stream, a vibratile unit comprising a torsional wave-driving means, torsional wave-detecting means, and a rod for excitation in a torsional mode of vibration interconnecting said driving means and said detecting means, said rod extending through the interior of said pipe between a pair of openings in the side walls of said pipe and adapted for immersion to a reference level in said test liquid, a source of carrier waves electrically connected to said driving means, gating means connected to said driving means and said source for modulating the waves of said source to produce a series of wave-trains which are propagated vibrationally along the length of said rod, means including an indicating circuit connected to said detecting means and synchronized by said gating means for displaying indications corresponding to the wave-trains propagated along said rod, and calibrated circuit means for measuring the effect of said viscous liquid under test on the wave-trains propagated along said rod.

15. An instrument in accordance with claim 14 which comprises in combination a second vibratile unit comprising a second torsional wave-driving means, a second torsional wave-detecting means, and a second vibratile rod interconnecting said second driving means and said second detecting means, said second rod enclosed within a liquid-tight jacket including a fluid of negligible viscosity, said jacket-enclosed rod extending through the interior of said pipe between a pair of openings in the sidewalls of said pipe adjacent said first vibratile unit, said second driving means connected to said source of carrier waves and said gating means, said second detecting circuit connected to said indicating means, and calibrated circuit means included in circuit relation between said first and second vibratile units for comparing the output wavetrains from said respective vibratile units on said indicating means.

References Cited in the file of this patent

UNITED STATES PATENTS

| | | |
|---|---|---|
| 2,340,992 | Siegel | Feb. 8, 1944 |
| 2,398,701 | Firestone | Apr. 16, 1946 |
| 2,461,543 | Gunn | Feb. 15, 1949 |
| 2,507,854 | De Lano, Jr. | May 16, 1950 |